(12) United States Patent
Dun et al.

(10) Patent No.: US 9,524,329 B2
(45) Date of Patent: Dec. 20, 2016

(54) PARTIAL ITEM CHANGE TRACKING AND SYNCHRONIZATION

(75) Inventors: Alec C. Dun, Redmond, WA (US); Joseph R. Warren, Renton, WA (US); Robert R. Novitskey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 13/107,383

(22) Filed: May 13, 2011

(65) Prior Publication Data
US 2011/0218963 A1 Sep. 8, 2011

Related U.S. Application Data

(63) Continuation of application No. 11/204,067, filed on Aug. 15, 2005, now Pat. No. 7,962,585.

(51) Int. Cl.
*G06F 15/177* (2006.01)
*G06F 17/30* (2006.01)
(Continued)

(52) U.S. Cl.
CPC ... *G06F 17/30584* (2013.01); *G06F 17/30575* (2013.01); *G06Q 50/24* (2013.01); *G06F 17/30581* (2013.01); *H04L 12/58* (2013.01)

(58) Field of Classification Search
CPC .............. H04L 12/58; G06F 17/30575; G06F 17/30578; G06F 17/30581; G06F 17/30584; G06Q 50/24
(Continued)

(56) References Cited

U.S. PATENT DOCUMENTS 5,923,848 A 7/1999 Goodhand et al.
5,966,714 A * 10/1999 Huang et al.
(Continued)

FOREIGN PATENT DOCUMENTS

CN 1426190 A 6/2003
EP 1 227 396 A1 7/2002
(Continued)

OTHER PUBLICATIONS

"Mac Sync, Everything Up to Date, Everywhere" Apple Computer, Inc., copyright 2006, 3 pages.
(Continued)

*Primary Examiner* — Krista Zele
*Assistant Examiner* — James Forman
(74) *Attorney, Agent, or Firm* — Danielle Johnston-Holmes; Tom Wong; Micky Minhas

(57) ABSTRACT

Embodiments herein change the way item syncing is handled and tracked between two devices. Changes to items are tracked in accordance with well defined property groups and each group is tracked independently of the other. For example, one group could contain large data items, e.g., attachments, while another group could include highly volatile properties like a follow-up flag. The present invention increases the sync rates between a client and a server by syncing only select portions of an item that have changed, without monitoring the change of each individual property within the item. Accordingly, if a change is made to a small data property (e.g., follow-up flag) on a relatively large email message, such change will not trigger a large download to a client running under a cached mode, nor will there be a requirement for high storage and processing for tracking each individual property.

24 Claims, 5 Drawing Sheets

(51) Int. Cl.
*G06Q 50/24* (2012.01)
*H04L 12/58* (2006.01)

(58) Field of Classification Search
USPC .......................................................... 709/221
See application file for complete search history.

(56) References Cited

U.S. PATENT DOCUMENTS

| | | | |
|---|---|---|---|
| 6,018,762 A * | 1/2000 | Brunson et al. | 709/206 |
| 6,052,735 A | 4/2000 | Ulrich | |
| 6,226,650 B1 | 5/2001 | Mahajan | |
| 6,295,541 B1 * | 9/2001 | Bodnar et al. | |
| 6,463,427 B1 | 10/2002 | Wu | |
| 6,757,696 B2 * | 6/2004 | Multer et al. | |
| 6,862,617 B1 * | 3/2005 | Wu | 709/224 |
| 6,993,522 B2 * | 1/2006 | Chen et al. | |
| 7,346,705 B2 * | 3/2008 | Hullot et al. | 709/238 |
| 7,962,585 B2 | 6/2011 | Dun et al. | |
| 2002/0099727 A1 * | 7/2002 | Kadyk et al. | 707/201 |
| 2003/0145020 A1 * | 7/2003 | Ngo et al. | 707/201 |
| 2003/0177171 A1 | 9/2003 | Brown, Jr. | |
| 2004/0044920 A1 | 3/2004 | Hullot et al. | |
| 2004/0073567 A1 | 4/2004 | Pelon | |
| 2004/0133644 A1 | 7/2004 | Warren | |
| 2004/0153576 A1 | 8/2004 | Hansmann | |
| 2004/0243571 A1 | 12/2004 | Judd | |
| 2005/0033777 A1 | 2/2005 | Moraes | |
| 2005/0071366 A1 | 3/2005 | Hobson | |
| 2005/0102328 A1 | 5/2005 | Ring | |
| 2005/0144044 A1 * | 6/2005 | Godschall et al. | 705/3 |
| 2005/0258806 A1 * | 11/2005 | Janik et al. | 320/155 |
| 2005/0262164 A1 | 11/2005 | Guiheneuf | |
| 2005/0267980 A1 | 12/2005 | Warren | |
| 2006/0123087 A1 * | 6/2006 | Gibson | 709/206 |
| 2007/0078941 A1 | 4/2007 | Dun et al. | |

FOREIGN PATENT DOCUMENTS

| | | | |
|---|---|---|---|
| EP | 1227396 | A1 | 7/2002 |
| EP | 1227396 | B1 | 4/2005 |
| JP | 2001508894 | A | 7/2001 |
| JP | 2001521521 | A | 11/2001 |
| JP | 2003228505 | A | 8/2003 |
| JP | 2006018821 | A | 1/2006 |
| RU | 2003138081 | A | 6/2005 |
| WO | 2005013139 | A1 | 2/2005 |

OTHER PUBLICATIONS

First Office Action in Chinese Patent Application No. 200680029649.X dated Nov. 13, 2009.
International Search Report and Written Opinion transmitted for PCT/US06/28480 mailed on Jul. 9, 2008, 7 pages.
Office Action in Australian Patent Application 2006280352 dated Oct. 6, 2010.
Sutton, Mark D.; "Data Synchronization: Which Technology?" Intel Optimizing Center, accessed at: http://www.devx.com/Intel/Article/17264/2217?pf+true; accessed on Mar. 16, 2006; 6 pages.
Sutton, Mark D.; "Identifying and Extracting Data Changes in the ADO>NETI DataSet" Intel Software Network, accessed at http://www.Intel.com/cd/ids/developer/asmo-na/eng-52805.htm; accessed on Mar. 16, 2006, 7 pages.
European Search Report mailed Sep. 1, 2011.
Rowstron, A. et al., "Probabilistic Modelling of Replica Divergence," *Proceedings of the Eighth Workshop on Hot Topics in Operating Systems*, pp. 55-60 (May 20-22, 2001).
European Search Report mailed Nov. 30, 2011.
"Search Report Issued in Malaysia Application No. PI20063433", Mailed Date: Feb. 15, 2012, 3 Pages.
"Office Action Issued in Korean Application No. 10-2008-7002131", Mailed Date: Feb. 6, 2013, 5 Pages. (W/o English Translation).
"Final Office Action Issued in U.S. Appl. No. 11/204,067", Mailed Date: Oct. 27, 2009, 24 Pages.
"Non-Final Office Action Issued in U.S. Appl. No. 11/204,067", Mailed Date: Aug. 4, 2010, 14 Pages.
"Non-Final Office Action Issued in U.S. Appl. No. 11/204,067", Mailed Date: Apr. 1, 2009, 19 Pages.
"Search Report Issued in European Application No. 11004886.5", Mailed Date: Nov. 30, 2011, 8 Pages.
"Office Action Issued in Israel Application No. 188781", Mailed Date: Sep. 26, 2011, 3 Pages. (W/o English Translation).
"Office Action Issued in Canada Application No. 2,616,103", Mailed Date: Mar. 8, 2013, 4 Pages.
"Office Action Issued in Canada Application No. 2,616,103", Mailed Date: Oct. 14, 2015, 6 Pages.
"Notice of Allowance Issued in Russian Application No. 2008105763", Mailed Date: Dec. 14, 2010, 20 Pages.
"Office Action Issued in Japan Application No. 2008-526948", Mailed Date: Oct. 18, 2011, 4 Page.
"First Office Action Issued in Chinese Application No. 201110100085.7", Mailed Date: Mar. 9, 2012, 8 Pages.
"Second Office Action Issued in Chinese Application No. 201110100085.7", Mailed Date: Feb. 4, 2013, 9 Pages.
"Third Office Action Issued in Chinese Application No. 201110100085.7", Mailed Date: Aug. 5, 2013, 12 Pages.
"Office Action Issued in Australia Application No. 2011202919", Mailed Date: Mar. 26, 2012, 2 Pages.
"Office Action Issued in Japan Application No. 2012-034223", Mailed Date: Mar. 5, 2013, 1 Page.
"International Preliminary Report on Patentability Issued in PCT Application No. PCT/US2006/028480", Mailed Date: Sep. 4, 2008, 6 Pages.
"Examination Report Issued in New Zealand Application No. 565592", Mailed Date: Sep. 28, 2009, 2 Pages.
Australian Notice of Allowance in Patent Application 2006280352 dated Mar. 2, 2011, 3 pgs.
Japanese Notice of Allowance dated Mar. 13, 2012 in Appln. No. 2008-526948, 6 pgs.
Malaysia Notice of Allowance dated Sep. 14, 2012 in Appln No. PI 20063433, 3 pgs.
Notice of Allowance dated Feb. 3, 2011 cited in U.S. Appl. No. 11/204,067, 12 pgs.
Office Action Received for Taiwan Patent Application No. 95126585, Mailed Date: Oct. 14, 2013, Filed Date: Jul. 20, 2006, 4 Pages.
Notice of Allowance Received for China Patent Application No. 201110100085.7, Mailed Date: Feb. 12, 2014, Filed Date: Jul. 20, 2006, 4 Pages.
Notice of Allowance Received for Taiwan Patent Application No. 95126585, Mailed Date: Jun. 9, 2014, Filed Date: Jul. 20, 2006, 4 Pages.
"Office Action Issued in Canada Patent Application No. 2616103", Mailed Date: Jul. 30, 2014, 5 Pages.
Office Action Issued in Indian Patent Application No. 1293/DELNP/2008, Mailed Date: Jun. 9, 2016, 8 Pages.

* cited by examiner

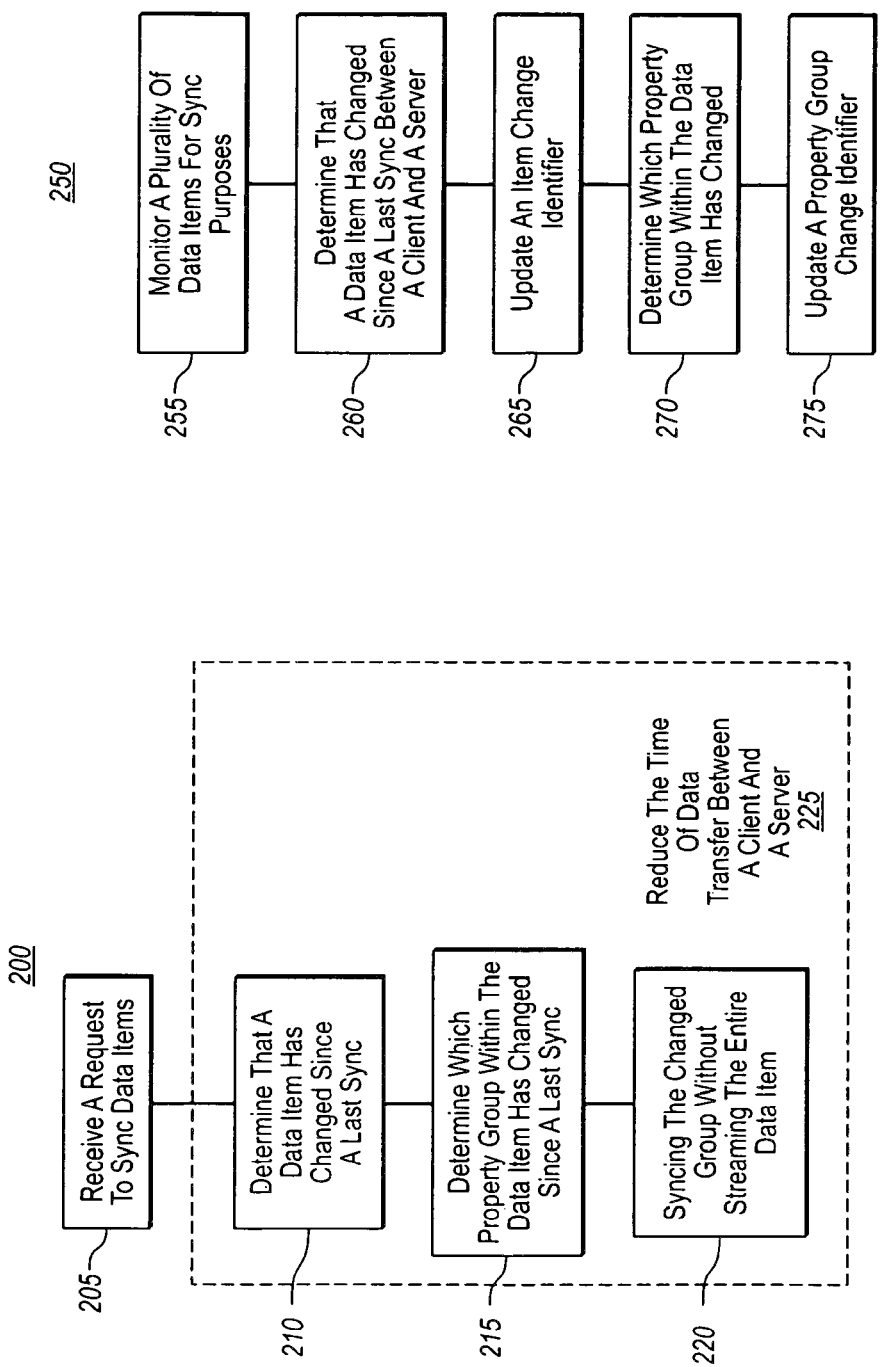

PARTIAL ITEM CHANGE TRACKING AND SYNCHRONIZATION

CROSS-REFERENCE TO RELATED APPLICATIONS

This application is a continuation of prior U.S. application Ser. No. 11/204,067, filed Aug. 15, 2005, the entire contents of which is incorporated herein by reference.

BACKGROUND

Laptop, handheld, and other portable computers or computing devices have increased in popularity as the devices become smaller in size and less expensive. Additionally, improved operating speed and processing power of portable computers has increased their popularity. Many portable computers are capable of storing multiple application programs, such as address books, games, calculators, and the like. The application programs can be permanently installed in the portable computer during manufacture (e.g., on Read-Only Memory (ROM)). Alternatively, one or more application programs may be installed by the user after purchasing the portable computer.

With the increased popularity and computing power of such devices, people are beginning to store data and applications using more than just a single computing device. Many people, for example, often use laptop computers in addition to their regular desktop computer. Other devices such as cellular telephones, Personal Digital Assistance (PDAs), Internet services, and the like are also used for storing data and applications.

Each of these computing devices may be part of a distributed computing system, wherein related information can be correlated and stored on multiple such devices. For example, an email client running in a cached mode is designed to keep a copy of a mailbox locally on the client. As such, if a user has a PDA and a desktop work computer, each device will have email items stored locally thereon. Ideally, the email information of the PDA should match the email information at the desktop work computer.

When the same or related information is stored in two places, it is possible for the data to change in one location and not in the other. This problem may be overcome through synchronization, which is an automated process that attempts to ensure that each device within the distributed system has the most current information or data. Synchronization, however, has its own set of problems. For example, when two devices sync with one another, typically such systems track changes on a per item basis, e.g., per email message, per contact, per appointment, etc. Accordingly, when two devices or computing systems attempt to sync, the entire item is downloaded regardless of how small the size of the property (e.g., flag, attachment, body, recipient, etc.) that was changed. Although for some high bandwidth transfer systems this full item tracking and syncing process posses little if any problems, with slower links, e.g., wireless connections, the downloading or streaming of an entire item can severally limit the transfer rate of data.

Consider for example an email message that includes, among other things, a follow-up flag property, recipient properties, a body property, and one or more attachments properties. If the follow-up flag is changed in color, the entire item must now be downloaded when syncing with another device. If the attachments and other data within the email are relatively large, this relatively small byte size change in the follow-up flag causes the entire item to be downloaded; thus producing large data transfer times over slow data links.

Even if a high bandwidth data link is used, it may still be undesirable to download an entire item. For example, when a customer pays for downloading items based on a number of bytes downloaded, if only a small amount of data has changed on an item, e.g., the follow-up flag noted above, the customer must still pay for the entire item to be downloaded. Such a waste of money can cause much frustration for users.

Some replication systems may be one solution to the above deficiencies of systems that track and sync devices on a per item basis. Although some replication systems provide for tracking changes on a property basis, these systems still have their own inherent problems. For example, the tracking of each individual property for a large number of items creates both high storage and high processing requirements. As such, these tracking and syncing systems are impractical for most uses.

SUMMARY

The above-identified deficiencies and drawbacks of current synchronization systems are overcome through exemplary embodiments of the present invention. Please note that the following summary is provided to introduce a selection of concepts in a simplified form that are further described below in the detail description. The summary, however, is not intended to identify key or essential features of the claimed subject matter, nor is it intended to be used as an aid in determining the scope of the claimed subject matter.

In one embodiment, methods, systems, and computer program products are provided for increasing sync rates between a client and a server by syncing only select portions of an item that have changed, without monitoring the change of each individual property within the item. In this embodiment, a request to sync data items that have changed since the last sync between a server and a client is received, wherein the data item represents a complete message with a plurality of properties that can be modified or otherwise changed. In response to the request to sync data, first it is determined that a data item has changed since the last sync. Such data item includes a plurality of property groups that are predefined based on industry wisdom and understanding of semantic for how properties within each of the plurality of property groups relate. Next, it is determined that at least one property group from among the plurality of property groups has changed since the last sync. Accordingly, the at least one property group can be synced without streaming the entire at least one data item in order to reduce the time of data transfer between the client and the server when syncing.

In another embodiment, methods, systems, and computer program products are provided for tracking changes to select portions of an item for increasing sync rates between a client and a server, without monitoring the change of each individual property within the item. In this embodiment, a plurality of data items are monitored for syncing purposes, wherein each of the plurality of data items present a complete message with a plurality of properties that can be modified or otherwise changed. During such monitoring, it is determined that a data item has changed since the last sync between the client and the server, wherein the data item includes a plurality of property groups that are predefined based on industry wisdom and understanding of semantics for how properties within each of the plurality of property groups relate.

Based on the determination that the data item has changed, an item change identifier associated with data item is updated, which will be used to identify that the data item has changed for syncing with the client. Accordingly, it is also determined that at least one property group from among the plurality of property groups has changed since the last sync. Based on the determination that the at least one property group has changed, a property group change identifier associated with the at least one property group is updated, which will be used to identify that the at least one property group has changed such that only the at least one property group will be synced with the client in order to reduce the time of data transfer between the client and the server.

In another embodiment, the present invention also provides for one or more computer-readable media having stored thereon an item data structure. The item data structure comprises the following: a plurality of properties that are capable of being modified or otherwise changed; an item change identifier for indicating if one or more of the plurality of properties have been modified or otherwise changed since the last sync with the client; a plurality of property groups, each including one or more properties from the plurality of properties, wherein the plurality of property groups are predetermined based on industry wisdom and understanding of semantics for how the one or more properties within each of the plurality of property groups related; and a plurality of property group change identifiers for indicating which of the plurality of property groups have changed for syncing only those property groups that have changed without syncing the entire item.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A illustrates a flow diagram for a method of increasing sync rates between a client and a server in accordance with example embodiments;

FIG. 2B illustrates a flow diagram for a method of tracking changes to select portions of an item in accordance with example embodiments.

DETAILED DESCRIPTION

Figure 1A:
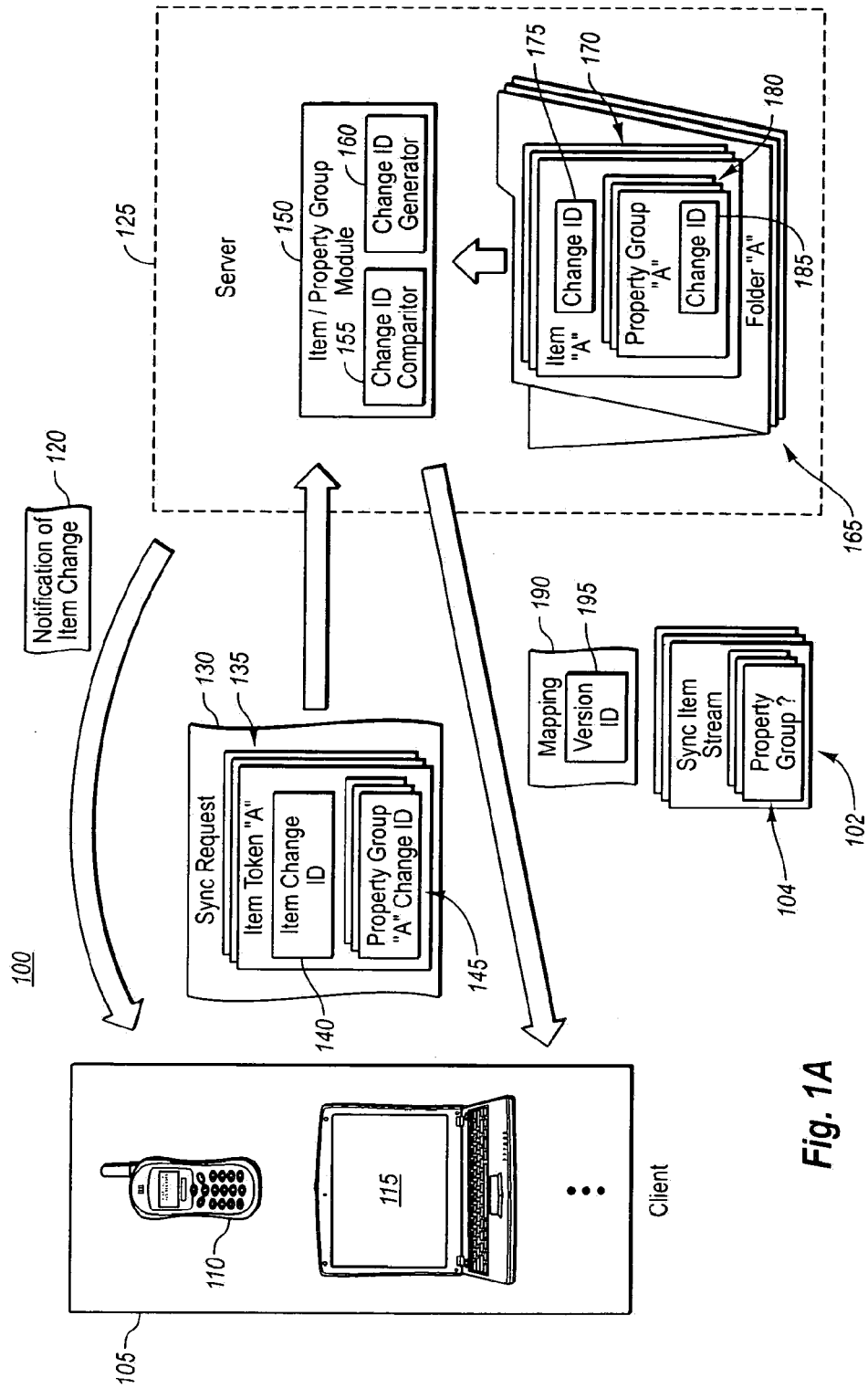
FIG. 1A illustrates a distributed system for syncing only property groups in accordance with example embodiments.

The present invention extends to methods, systems, and computer program products for increasing sync rates by syncing only select portions of an item that have changed. The embodiments of the present invention may comprise a special purpose or general-purpose computer including various computer hardware or modules, as discussed in greater detail below.

Prior to discussing in detail embodiments herein, it will be useful to define some terms that will be used throughout the application. First, a "data item" or "item" is used herein to represent a complete message with properties that can be modified or otherwise changed. For example, a data item may be complete email message, a complete contact, a complete appointment, a complete task, a complete sticky note or any other type of message that may be synced between two computing devices. A "property" for an item represents a portion of a message that can be modified or otherwise changed independently of other properties. Examples of such properties includes things like a follow-up flag, priority flag, a body of an item, individual attachments, individual recipients, a message status, message priority, or any other well known property for a message. Example embodiments provide that properties may be divided into "property groups," which as described in greater detail below, are predefined based on industry wisdom and understand of semantics for how properties within each of the property groups relate.

Embodiments herein change the way item syncing is handled and tracked between two devices, e.g., a server and a client. Changes to items are placed into the above-mentioned well defined property groups and each group is tracked independently of the other. For example, one group could contain the body of an item, and another group could contain the attachments, while still another group could include highly volatile properties like a follow-up flag, a read status, a priority flag, etc. Note that because the property groups are well defined based on industry wisdom, embodiments herein strike a balance between a data transfer rate and storage and/or processing requirements needed for typical replication systems. In other words, the present invention increases the sync rates between a client and a server by syncing only select portions of an item that have changed, without monitoring the change of each individual property within the item. Accordingly, if a change is made to a small data property (e.g., follow-up flag) on a relatively large email message, such change will not trigger a large download to a client running under a cached mode, nor will there be a requirement for high storage and processing for tracking each individual property.

Prior to describing further details for various embodiments of the present invention, a suitable computing architecture that may be used to implement the principles of the present invention will be described with respect to FIG. 3. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

Figure 3:
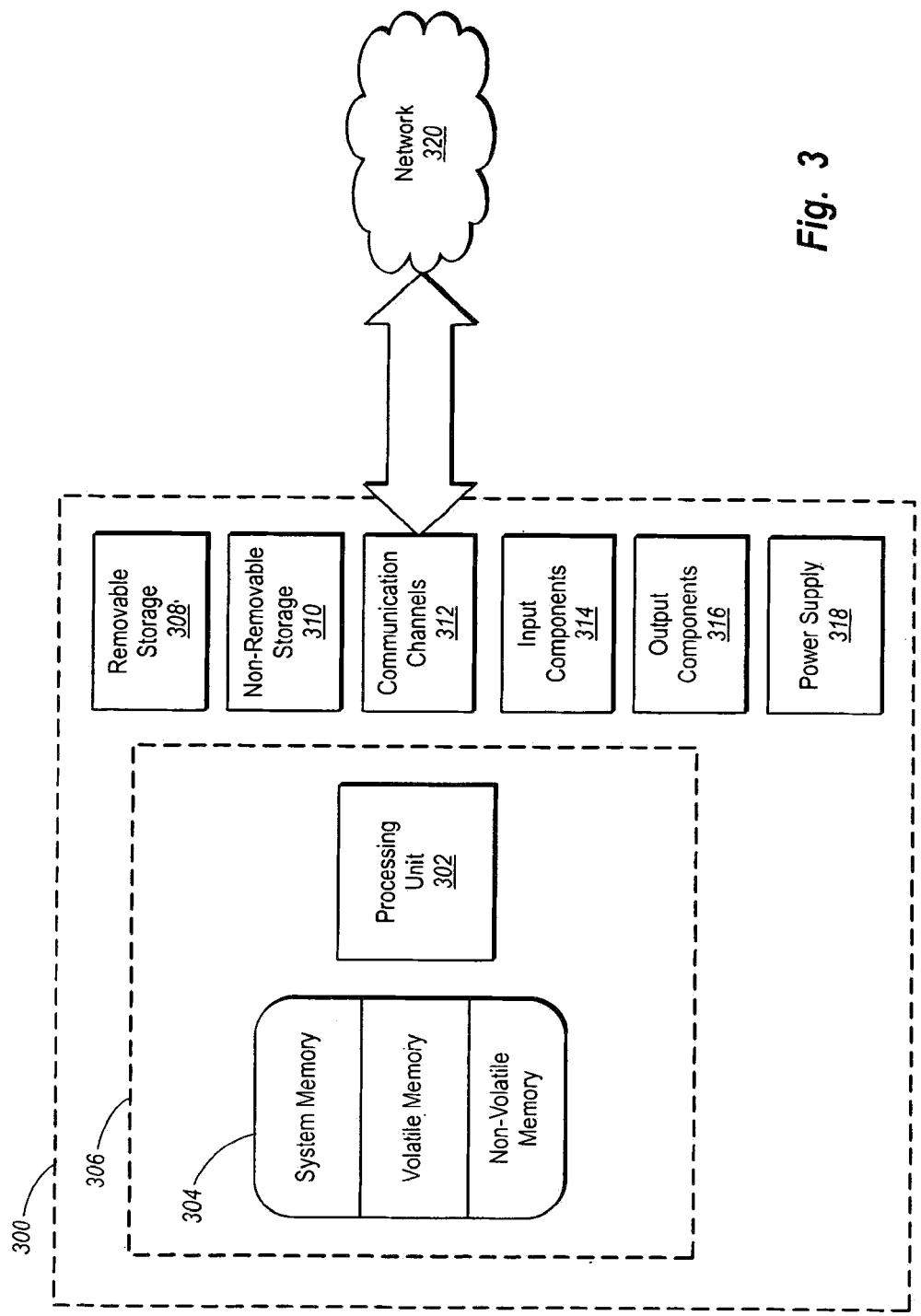
FIG. 3 illustrates an example computing system that provides a suitable operating environment for implementing various features of the present invention.

FIG. 3 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 3.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 300 typically includes at least one processing unit 302 and memory 304. The memory 304 may be volatile (such as RAM), non-volatile (such as ROM, flash memory, etc.), or some combination of the two. This most basic configuration is illustrated in FIG. 3 by the dashed line 306. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 3 by removable storage 308 and non-removable storage 310. Computer-storage media include volatile and non-volatile, removable and non-removable media implemented in any method or technology for storage of information such as computer-readable instructions, data structures, program modules, or other data. Memory 304, removable storage 308, and non-removable storage 310 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Computing system 300 may also contain communication channels 312 that allow the host to communicate with other systems and devices over, for example, network 320. Communication channels 312 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 300 may also have input components 314 such as a keyboard, mouse, pen, a voice-input component, a touch-input device, and so forth. Output components 316 include screen displays, speakers, printer, etc., and rendering modules (often called "adapters") for driving them. The computing system 300 has a power supply 318. All these components are well known in the art and need not be discussed at length here.

FIG. 1A illustrates a distributed system 100 for syncing property groups 104 between a client 105 and a server 125 in accordance with example embodiments. The distributed system 100 may be similar to the computing system 300 described above with regards to FIG. 3, although that need not be the case. As shown in FIG. 1A, distributed system 100 includes a client 105 that can be any one of a number of computing devices 110, 115, etc. For example, the client 105 may be a wireless device such as a phone 110, PDA 110, laptop computer 115, or any other computing device.

Note that the present invention is most advantageous in those systems in which data links are slow, e.g., wireless communication. The present invention, however, is not limited to such links and can be utilized in any environment. For example, as previously mentioned, the present invention may be utilized in systems that requires user to pay for services based on the amount of data transferred from a server 125 to a client 105. Accordingly, any specific reference to a specific data link between a server 125 and a client 105 is used herein for illustrative purposes only and is not meant to limit or otherwise narrow the scope of the present invention unless explicitly claimed.

Further note that although the present invention will be described in terms of a server 125 and client 105, the roles of these devices in describing embodiments herein may be interchanged. For example, the following description will be described in terms of changes to items 170 that occur on the server 125, wherein such changes are synced by streaming changes to the client 105. Note, however, that changes on the client 105 may also be tracked and uploaded to the server 125. As such, the following description for events that happen between a server 125 and client 105—as well as any particular device herein used for either the client 105 or server 125—are used herein for illustrative purposes only and are not meant to limit or otherwise narrow the scope of the present invention unless explicitly claimed.

As shown in FIG. 1A, server 125 includes a plurality of folders 165 (e.g., folder "A"), wherein each folder 165 may represent or include certain types of items 170. For example, a folder 165 may contain or include email item messages, wherein another folder 165 may include contact item information. Of course, as previously mentioned, there may be a wide verity of items types that can be synced in accordance with example embodiments provided herein. In addition, other topologies and data configurations other then folders 165 may be used in practicing the present invention. For example, tables or other ways of variously separating and storing different types of items 170 are also available to the present invention. Accordingly, any particular topology, data format, and/or storage hierarchy are used herein for illustrative purposes only and are not meant to limit or otherwise narrow the scope of the present invention.

Each folder 165, as previously mentioned, will contain a plurality of items 170 (e.g., item "A"). Associated with each item 170 is an item change identifier (ID) 175 that, as described in greater detail below, may be used to identify when an item 170 and property thereof has been changed since the last sync between server 125 and client 105. Also included within each item 170 are property groups 180 (e.g., property group "A"). As previously mentioned, the property groups 180 are predefined based on industry wisdom and understand of semantics for how properties within each of the plurality of property groups 180 relate. For example, the property groups may be determined based on the volatility of the properties, typical memory size requirements, and/or other considerations. Further, a property group 180 may include properties that are highly volatile such as a message status, follow-up flag, priority flag, or other properties that are frequently modified and/or changed.

Alternatively, or in conjunction, property group 180 may be defined based on the relative size of the properties when compared to other properties. For example, attachments are typically of larger size than other properties, and therefore may reside in one property group, whereas smaller data sizes such as recipients and/or the body of a message may reside in another property group 180. There may even be a miscellaneous property group 180 for those properties that do not relate well with other properties.

Note that although the property groups 180 are predefined based on current industry wisdom, such knowledge is subject to change. Accordingly, embodiments provide that the property groups 180 are extensible, pluggable, and scaleable. That is, property groups 180 are configured in such a way that properties within each property group 180 can be moved, deleted, added, and/or otherwise modified. Similarly, the property groups 180 themselves can be redefined, created, and/or deleted. In addition, the definition of property groups 180 may vary depending upon the type of item 170. For example, the property groups 180 defined for an email item 170 may be different then the property groups 180 defined for contact items 170. As such—as will be described in greater detail below—the client 105 will needs to know the appropriate mapping 190 that is being used for each item 170 within the various folders 165.

Regardless of how the property groups 180 are defined, each property group 180 will typically have assigned therewith a property group change ID 185, which can be used to identify when changes have occurred to that particular property group 180. For example, item/property group module 150 can monitor changes occurring to an item 170, and also for each property group 180 within such item 170. As changes occur, change ID generator 160 can change the item change ID 175 and the appropriate property group change ID 185.

In some embodiments, the item change ID 175 and the property change ID 185 may be the same identifier, indicating, e.g., that the item and property group were updated at the same time. Note, however, that this need not be the case in for example where Global Unique Identifiers (GUIDs) are used. It should be further noted that the change IDs 175, 185 may be any well known alphanumeric or other identifying data object. For example, the change IDs 175, 185 could be a hash of the item 170 and/or property group 185, respectively. Of course, as previously mentioned, the change identities 175, 185 may be generated based upon a simple counter of GUIDs. Note also that other mechanisms for identifying changes to items 170 and property groups 180 are also available to the present invention. Accordingly, any specific type of change identifier 175, 185, and/or use thereof as described herein for identifying changes, are for illustrative purposes only and are not meant to limit or otherwise narrow the scope of the present invention unless explicitly claimed.

Regardless of the type of identity 175, 185 or how the change to the property groups are identified, when the item/property module 150 within server 125 identifies the change of one or more items 170 notification of such item change 120 may be sent to the client 105 in an attempt to prompt the client 105 to sync with the server 125. Of course, other mechanisms for prompting a client 105 to sync with the serer 125 are also available to the present invention. For example, client 105 may periodically, i.e., at certain predefined intervals, query the server 125 to sync therewith. Accordingly, any specific initiation of the synchronization process between a client 105 and server 125 is used herein for illustrative purposes only and is not meant to limit or otherwise narrow the scope of the present invention.

Nevertheless, upon initiation of the sync process, server 125 should receive a sync request 130 from client 105. Exemplary embodiments provide that the sync request 130 may include one or more item tokens 135s (e.g., item token "A") that may be used in determining if changes have occurred since the last sync between a client 105 and server 125. Prior to discussing the item token 135 in great detail, note that the item tokens 135 do not necessarily need to be included within the sync request 130. For example, other handshake mechanisms may otherwise prompt the client 105 to send the item tokens 135 to the server 125. Alternatively, the item tokens 135 may already be stored on the server 125. Accordingly, the inclusion of the item tokens 135 within the sync request 130 is used herein for illustrative purposes only and is not meant to limit or otherwise narrow the scope of the present invention unless explicitly claimed.

Associated with each item token 135 is an item change ID 140. For each item change ID 140 or item token 135, there is also a plurality of property group change IDs 145 (e.g., property group "A" change ID). The item change ID 145 and property group change IDs 145 represent those identifiers that were associated with items 170 and corresponding property groups 180 for the last sync between the client 105 and the server 125. In other words, item tokens 135 may have been handed down to the client 105 as a blob of data to be stored during the last sync with the server 125. This blob of data 135 may then be used by the change identifier comparator 155 in determining those items 170, and more specifically those property groups 180 within each item 170, that have changed since a last sync.

For example, each item token 135 may be compared to each item 170. More specifically the change IDs 175, 140 and property group IDs 185, 145 in both the item tokens 135 and actual items 170 can be compared using change identifier comparator 155. If the values differ, i.e., the item change ID 140 and a property group ID 145 for the item token 135 do not match the item change ID 175 and property group ID 185, then a change in the item 170 and property groups 180 has occurred. As previously noted, although the change IDs for the item tokens 135 are compared with the items 170 and property groups 180 on the server 125 in determining when items 170 and property groups 180 have changed since the last sync, other methods of determining when or if changes to items 170 and property groups 180 have occurred are also available to the present invention. For example, the server 125 may store all of the information needed to determine what changes are needed on the client side 105, without the need for change IDs 140, 145, 175, 185. Accordingly, the specific use of the change IDs 140, 145, 175, 185, as described herein, is for illustrative purposes only and is not meant to limit or otherwise narrow the scope of the present invention unless explicitly claimed.

Regardless of how the property groups 104 that have changed are identified, such changed property groups 104 can be included within the sync item stream 102, which can then be sent to the client 105 in accordance with example embodiments described herein below. Further, as previously mentioned, a mapping 190 identified by a specific versioning ID 195 can also be sent either before, during, or after the sync item stream 102. As will also be discussed in greater detail below, the property groups 104 within the sync item stream 102 should identify the particular mapping 190 version 195 used for such property group 104.

Figure 1B:
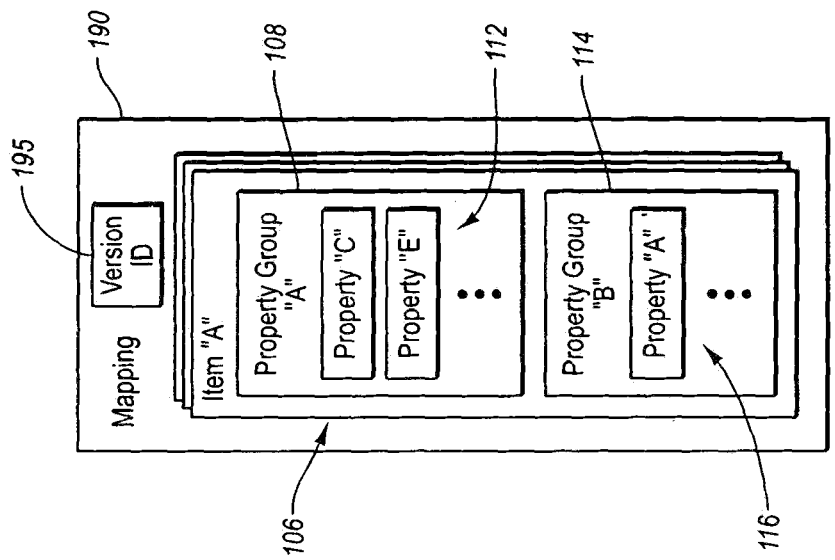
FIG. 1B illustrates a mapping of property groups for an item in accordance with example embodiments.

FIG. 1B illustrates an example block diagram of a mapping 190 for a particular version identifier 195. As shown, the mapping 190 includes a plurality of items 106 and property groups 108, 114 for each item 106. Of course, there may be any number of property groups 108, 114 that can be identified within any particular item 106. Further, the properties 112, 116 are also mapped for each particular property group 108, 114. For example, property group "A" 108 may include properties 112 "C" and "E", whereas property group "B" 114 may include property "A" 106.

Consider the example wherein the mapping 190 identifies an email item 106 with a property group "A" 108 for relatively small, volatile data properties, whereas the mapping for property group "B" 114 includes larger properties. As such, property "C" 112 and property "E" 112 within property group "A" 108 may be a follow-up flag and priority flag, respectively. On the other hand, property "A" 116 for property group "B" 114 may be attachment files. Of course, other well known ways of providing mappings 190 are also available to the present invention. Accordingly, the mapping configuration provided for within FIG. 1B is used herein for illustrative purposes only and is not meant to limit or otherwise narrow the scope of the present invention unless explicitly claimed.

Note that the current and previous property group mappings 190 may be persisted on the server database and can be accessed by the version ID 195. If an item 170 is encountered which has a version identifier 195 that is not known, or it does not have a group identifier, it should be treated as if it does not have any property groupings 180 and should be treated as a whole. Accordingly, if an item 170 like these needs to be downloaded to a client 105, the entire item 170 is streamed 102.

Figure 1C:
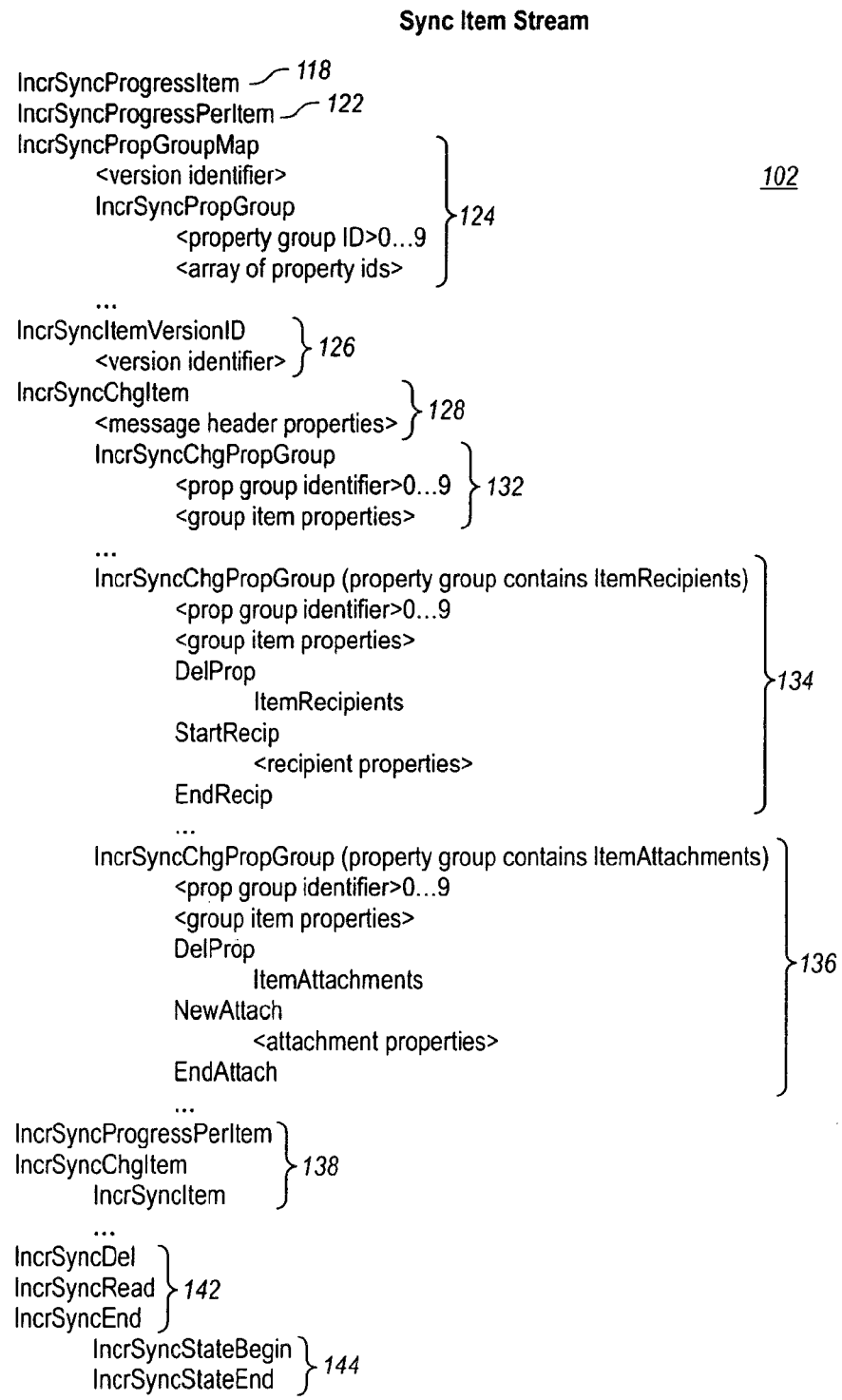
FIG. 1C illustrates an example sync item stream in accordance with example embodiments.

One embodiment provides for synchronization through a streaming mechanism referred to herein as fast transfer. Such process allows the server 125 to respond to the sync request 130 by breaking changed property groups 104 down and serializing them into a raw binary stream. Server 125 packages up as much of the message 102 as it can in a fixed size response buffer and returns the data 102 to the client 105. The client 105 then parses the data and rebuilds the property groups 104 by unserializing the byte stream 102. An example format of the byte stream 102 is shown below with regards to FIG. 1C, which illustrates an example of sync item stream 102, i.e., a wire transfer (or wireless transfer) data representation of what the sync item stream 102 may look like.

The first portion of the sync item stream 102 is an IncrSyncProgressItem 118 that is added to the beginning of the stream 102 for providing information on the total size of all the items that will follow in response stream 102. Next, IncrSyncProgressPerItem 122 indicates the total size of the next item in the sync item stream 102. The next grouping 124 within the sync stream 102 is the mapping as indicated by the marker IncrSyncPropGroupMap, which tells the client 105 what property group mapping the next item or items in the stream 102 uses. Accordingly, various property groups 180 can be identified using the IncrSyncPropGroup marker and an array or list of the property IDs within each property group 180. In other words, the sync item stream 102 can include a mapping 190, or a group of mappings 190, for various version IDs 195 as described herein. Note, however, as previously described, mappings 190 do not necessarily need to be included within the sync item stream 102, but can follow or lead the sync stream 102.

The next set of tags 126, i.e., IncrSynPropGroup ID, signify what property group mapping the next item or items in the stream uses. That is, the versions ID within this group 126 identifies the mapping 190 version identity 195 for the following item. Next, the IncrSnyChgItem 128 is a marker to signify the beginning of a changed item, which will be followed by an array of property groups to be changed within the item. For example, as shown by the markers in IncrSnyChgPropGroup 132 various property groups that have been changed can be identified. For example, as shown in stream 134 IncrSnyChgPropGroup changes the recipient properties by first having DelProp element that deletes the current ItemRecipients and then replaces the recipient properties using the StartRecip and EndRecip markers. As another example, the elements in stream 136 include an IncrSyncChgPropGroup for item attachments such that the current ItemAttachments will be deleted using a DelProp and replaced using NewAttach and EndAttach markers. Of course, other property groups can be included within the stream as indicated by the ellipses provided thereafter.

Other exemplary embodiments provide for combining existing methods of synchronizing items with current embodiments provided herein. For example, in legacy systems where no mapping is provided, the entire item may be downloaded within the sync item stream 102. For example, as shown in elements 138, an IncrSyncProgressPerItem indicates the total size of the next item and the IncrSyncChgItem marks the beginning of changing an item. The next markers, i.e., markers 142 for IncrSyncDel, IncrSyncRead, and IncrSyncEnd, signify the following: (1) a list of items to be deleted from the client 105; (2) a read state transition as follows; and (3) a marker that signifies the end of the synchronization session, respectively. Finally, the IncrSyncStateBegin signifies that the final synchronization state follows in the byte stream and the IncrySyncStateEnd are marker signifies that the synchronization state is complete.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagrams for FIGS. 2A and 2B—is used to indicate the desired specific use of such terms.

FIGS. 2A and 2B illustrate flow diagrams for various exemplary embodiments of the present invention. The following description of FIGS. 2A and 2B will occasionally refer to corresponding elements from FIGS. 1A-C. Although reference may be made to a specific element from these figures, such elements are used for illustrative purposes only and are not meant to limit or otherwise narrow the scope of the present invention unless explicitly claimed.

FIG. 2A illustrates a flow diagram for a method 200 of increasing sync rates between a client and a server by syncing only select portions of an item that have changed, without monitoring the change of each individual property within the item. Method 200 includes an act of receiving 205 a request to sync data items. For example, server 125 may receive sync request 130 to sync data items 170 that have changed since a last sync between the server 125 and client 105, wherein the data items 170 represent complete messages with various properties that can be modified or otherwise changed. For example, a data item 170 may be an email message, contact, appointment, calendar information, task, sticky notes, etc. Properties may include recipients, addresses, bodies, attachments, flags, state identifiers, or any other myriad of properties for a message. Also note that the data link between the server 125 and the client 105 for syncing data items 170 may be a wireless connection, or a wired connection, wherein a customer on the client 105 pays for syncing of the data items 170 based on a number of bytes downloaded from the server 125.

Method 200 also includes a step for reducing 225 the time of data transfer between client and server. More specifically, step for 225 includes an act of determining 210 that a data item has changed since the last sync. For example, server 125 may determine (using change ID comparator 155 or other methods described herein) that a data item 170 has changed since the last sync between the client 105 and server 125. As previously mentioned, the data items 170 include property groups 170 that are predefined based on industry wisdom and understand of semantics for how one or more properties within each of the property groups relate. For example, in an email message the various property groups may include a body property, recipient property group, subject property group, attachment property group, priority flag property group, read status property group, miscellaneous property group, and/or any combination thereof. Of course, other property groups may be defined and are extensible, pluggable, and scalable, such that properties within the property groups can be added, deleted, or otherwise redefined therein, and such that each of the property groups can be added, deleted, or otherwise redefined based on changes in industry wisdom.

Step for 225 also includes and act of determining 215 which property group within the data item has changed since the last sync. For example, item/property group module 155 and change ID comparator 155 may be used to determine which property groups 180 have changed since the last sync. Accordingly, step for 225 includes an act of syncing 220 the changed group or groups without streaming the entire data item. In particular, sync item stream 102 may be streamed to the client 105 with various property groups 104 that have changed since the last sync, without streaming an entire data item 170 in order to reduce the time of data transfer between the client and the server when syncing.

The determination of the change in the data item 170, as well as the property group 180, may be based on change identifiers 140, 145, 175, 185 for the data item and the property group. Further, the change identifiers 141, 145, 175, 185 for the data item 170 and the property groups 180 may be the same. Further, the change identifiers 140, 145, 175, 185 for the data item 170 and the property groups 180 may be an alphanumeric number, global unique identifier, or a hash value.

Other embodiments provide for a mapping 190 of the data item 170 and the property groups 180 therein. The mapping may be sent before, during, or after sending the syncing item stream of the property groups 104 that have changed. In any event, the client 105 can use the mapping 190 to know what properties are included in each of the property groups 180. Moreover, a second data item 170 may be determined to have changed, but does not have a property group 180. In such instance, the entire second data 170 item may be streamed to the client 105.

FIG. 2B illustrates a flow diagram for a method 250 of tracking changes to select portions of an item for increasing sync rates between a client and a server, without monitoring the change of each individual property within the item. Method 250 includes an act of monitoring 255 a plurality of data items for sync purposes. For example, items/property group module 150 or other components may monitor data items 170 wherein the data items 170 represent a complete message with a plurality of properties that can be modified or otherwise changed. Such properties include, but are not limited to, those previously described herein, e.g., attachments, flags, body parts, etc.

Method 250 also includes an act of determining 260 that a data item has changed since the last sync between a client and a server. For example, change identifier comparator 155 can be used to determine that a data item 170 has changed since the last sync between the server 125 and a client 105. As previously mentioned, the data item includes a plurality of property groups 180 that are predefined based on industry wisdom and understanding of semantics for how properties within each of the property groups relate. Based on the determination that the data item has changed, method 250 further includes an act of updating 265 an item change identifier. For example, change identifier generator 160 can be used to update item change ID 175 associated with a data item 170, which will be used to identify that the data item 170 has changed for syncing with the client 105.

Similarly, method 250 includes an act of determining 270 which property group within the data item has changed. That is, change identifier comparator 155 within item/property group module 150 can be used to determine which property groups 180 have changed since a last sync between the client 105 and server 125. Based on the determination that a property group has changed, method 250 includes an act of updating 275 a property group change identifier. For example, change identifier generator 160 can be used to update change ID 185 for property group 180, which will be used to identify that the property group 180 has changed such that only the property group 180 will be synced with the client 105 in order to reduce the time of data transfer between the client 105 and server 125. Note also that the other alternative embodiments described above are also available to method 250.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of synchronizing electronic mail messages between a first device and a second device, the method comprising:
   storing an electronic mail message at the first device, the electronic mail message including a plurality of property groups, each of the property groups including one or more properties, at least one of the property groups including multiple properties;
   monitoring a plurality of data items for sync purposes, the plurality of data items including the electronic mail message;
   using an item change identifier to determine that the electronic mail message has changed after the last sync; and
   after determining that the electronic mail message has changed after the last sync, determining which property group in the electronic mail message has changed, including using change IDs for the property groups to identify the changed group in the electronic mail message; and
   performing a synchronization process that synchronizes the electronic mail message on the first device and a second device, the synchronization process including streaming the particular property group to the second device, the electronic mail message being synchronized on the first device and the second device without streaming the entire electronic mail message from the first device to the second device, the particular property group being among the property groups of the electronic mail message, one or more properties in the particular property group having changed since a last sync.

2. The method of claim 1, wherein the plurality of property groups includes a follow-up property group and a read status property group.

3. The method of claim 1, further comprising:
   sending a sync request from the first device to the second device; and
   receiving the changed group from the second device as a response to the sync request.

4. The method of claim 3,
   wherein the method further comprises:
      receiving an item token from the second device during the last sync; and
      storing the item token at the first device; and
   wherein the sync request comprises the item token.

5. The method of claim 4, wherein the item token is usable to determine property groups within the electronic mail message that have changed since the last sync.

6. The method of claim 1, wherein the changed group includes more than one of the properties of the electronic mail message.

7. The method of claim 1,
   wherein the method further comprises:
      after determining that the electronic mail message has changed after the last sync, updating the item change identifier; and
      after using the change IDs for the property groups to identify the changed group, updating the change ID for the changed group.

8. The method of claim 1,
   wherein performing the synchronization process comprises receiving a sync item stream at the first device, the sync item stream including a marker that indicates a mapping that tells the first device what property group mapping the electronic mail message uses; and
   wherein the property group mapping maps the properties in the electronic mail message to the property groups.

9. The method of claim 1, further comprising receiving, at the first device, a notification of item change, the notification of item change prompting the first device to sync with the second device.

10. The method of claim 1, wherein the property groups are determined based on relative sizes of the properties.

11. A computing device that comprises:
    one or more computer storage media that store instructions and an electronic mail data item, the electronic mail data item comprising a plurality of properties, the plurality of properties divided into a plurality of property groups, each of the property groups containing one or more of the properties, at least one of the property groups containing multiple properties; and
    a processing unit that reads and executes the instructions, execution of the instructions by the processing unit causing the computing device to:
    determine that a property in a particular property group has changed;
    update a property group change identifier for the particular property group after determining that the property in the particular property group has changed;
    use the property group change identifier to identify when changes have occurred to the particular property group; and
    sync a changed group in the electronic mail data item without streaming the entire electronic mail data item from another computing device, the changed group being among the property groups of the electronic mail data item, one or more properties in the changed group having changed since a last sync between the computing device and the other computing device.

12. The computing device of claim 11, wherein execution of the instructions by the processing unit causes the computing device to send a sync request to the other computing device after the computing device receives a notification of item change from the other computing device, the sync request being a request to sync data items that have changed since the last sync between the other computing device and the computing device.

13. The computing device of claim 11, wherein the property groups are based on volatility of the properties.

14. The computing device of claim 11, wherein the property groups are configured in such a way that the property groups can be redefined.

15. The computing device of claim 11, wherein execution of the instructions by the processing unit causes the computing device to:

update an item change identifier associated with the data item based on a determination that the electronic mail data item has changed; and determine that the electronic mail data item has changed when the item change identifier differs from an item change identifier received from the other computing device.

16. The computing device of claim 11, wherein the computing device is a client and the other computing device is a server.

17. A method of increasing sync rates for a client device, the method comprising:

transmitting a request from the client device to synchronize one or more electronic mail data items that have changed after a last synchronization, each of the one or more electronic mail data items comprising a plurality of modifiable properties, the plurality of modifiable properties in each of the one or more electronic mail data items divided into a plurality of property groups that includes at least a read property group and a follow-up flag property group, the read property group including a property that indicates whether the electronic mail data item has been read, the follow-up flag property group including a property that indicates whether a follow-up flag has been set on the electronic mail data item;

in response to the request to synchronize the one or more electronic mail data items that have changed after the last synchronization, receiving a modified property group at the client device without receiving one or more unmodified property groups in the plurality of property groups of a first electronic mail data item from among the one or more electronic mail data items, wherein none of the properties in the unmodified property groups have values changed after the last synchronization, and wherein the modified property group is identified in the plurality of property groups using a property group change identifier.

18. The method of claim 17, wherein transmitting a request from the client device includes transmitting the request to a server device.

19. The method of claim 17, further comprising:

determining that a second electronic mail data item has changed, wherein the second electronic mail data item lacks the plurality of property groups; and receiving all of the second electronic mail data item at the client device.

20. The method of claim 17, wherein the plurality of property groups are predefined based on volatility of the one or more properties within each of the property groups.

21. The method of claim 17, wherein receiving the modified property group comprises receiving streamed data including the modified property group via a wired connection.

22. A method of increasing sync rates for a client device, the method comprising:

transmitting a request from a client device to synchronize one or more electronic mail data items that have changed after a last synchronization, each of the one or more electronic mail data items comprising a plurality of modifiable properties, the plurality of modifiable properties in each of the one or more electronic mail data items divided into a plurality of property groups that includes at least a read property group and a follow-up flag property group, the read property group including a property that indicates whether the electronic mail data item has been read, the follow-up flag property group including a property that indicates whether a follow-up flag has been set on the electronic mail data item;

determining that a first electronic mail data item of the one or more data items has changed after the last synchronization;

determining whether the plurality of property groups of the first electronic mail data item includes a modified property group, wherein a value of a property in the modified property group has changed after the last synchronization, and wherein the modified property group is identified in the plurality of property groups using a property group change identifier; and synchronizing the modified property group without streaming one or more unmodified property groups in the plurality of property groups of the first electronic mail data item, wherein none of the properties in the unmodified property groups have values changed after the last synchronization.

23. The method of claim 22, wherein the property groups are predefined based on typical memory size of the one or more properties within each of the property groups.

24. The method of claim 22, wherein synchronizing the modified property group comprises downloading, from the server device, the modified property group to the client device using a data link that is a wireless connection.

* * * * *